United States Patent
Wakefield

(10) Patent No.: US 11,103,334 B2
(45) Date of Patent: Aug. 31, 2021

(54) DEVICE FOR REMOVING MATERIAL FROM THE ORAL CAVITY OF A PATIENT

(71) Applicant: Simon Joseph Wakefield, Merseyside (GB)

(72) Inventor: Simon Joseph Wakefield, Merseyside (GB)

(73) Assignee: Simon Joseph Wakefield, Merseyside (GB)

( * ) Notice: Subject to any disclaimer, the term of this patent is extended or adjusted under 35 U.S.C. 154(b) by 5 days.

(21) Appl. No.: 16/340,455

(22) PCT Filed: Apr. 12, 2017

(86) PCT No.: PCT/EP2017/058894
§ 371 (c)(1),
(2) Date: Apr. 9, 2019

(87) PCT Pub. No.: WO2018/068901
PCT Pub. Date: Apr. 19, 2018

(65) Prior Publication Data
US 2019/0262110 A1    Aug. 29, 2019

(30) Foreign Application Priority Data
Oct. 14, 2016    (GB) ...................................... 1617529

(51) Int. Cl.
*A61C 17/10*    (2006.01)
*A61C 17/08*    (2006.01)
*A61C 5/90*    (2017.01)

(52) U.S. Cl.
CPC ................ *A61C 17/10* (2019.05); *A61C 5/90* (2017.02); *A61C 17/08* (2019.05)

(58) Field of Classification Search
CPC ............................ A61C 5/90; A61C 17/06–14
(Continued)

(56) References Cited

U.S. PATENT DOCUMENTS 2,637,107 A * 5/1953 Daigle ..................... A61C 5/90
433/136
3,557,456 A * 1/1971 Hutchinson ............ A61C 17/08
433/96
(Continued)

FOREIGN PATENT DOCUMENTS

CN    203153688 U    8/2013
KR    101522314 B1    5/2015

OTHER PUBLICATIONS

International Search Report and Written Opinion of the International Searching Authority for International Application No. PCT/EP2017/058894 dated Jul. 7, 2017.
(Continued)

*Primary Examiner* — Edward Moran
*Assistant Examiner* — Matthew P Saunders
(74) *Attorney, Agent, or Firm* — Heslin Rothenberg Farley & Mesiti P.C.; Victor A. Cardona, Esq.

(57) ABSTRACT

A device for removing material from the oral cavity of a patient during a procedure while propping the patient's jaws includes a bite block shaped to be held between upper and lower jaws of the patient at one side of the oral activity in a manner that provides access to teeth and/or gums at the opposite side of the oral cavity, without being substantially impeded by the device.

An oral evacuation tube, through which material passes when it is sucked out of the oral cavity, is sufficiently elongate so that a part thereof may be located outside the oral cavity so that it can be operably connected to a suction device when the bite block is in use.

A cheek protector is shaped to protect an inner cheek area at the same side of the oral cavity as the bite block.

The bite block, evacuation tube and cheek protector are integral, non-releasable parts of the device.

9 Claims, 7 Drawing Sheets

(58) Field of Classification Search
USPC .................................................. 433/91–93
See application file for complete search history.

(56) References Cited

U.S. PATENT DOCUMENTS

| | | | | | |
|---|---|---|---|---|---|
| 3,768,477 | A | * | 10/1973 | Anders | A61C 17/08 433/91 |
| 3,924,333 | A | * | 12/1975 | Erickson | A61C 17/08 433/93 |
| 3,965,901 | A | * | 6/1976 | Penny | A61M 1/008 604/119 |
| 4,167,814 | A | | 9/1979 | Schubert | |
| D270,183 | S | * | 8/1983 | Govenius | D24/112 |
| 4,495,945 | A | | 1/1985 | Liegner | |
| 4,802,851 | A | * | 2/1989 | Rhoades | A61C 17/08 433/93 |
| D312,872 | S | * | 12/1990 | Mahl | D24/112 |
| 4,975,057 | A | * | 12/1990 | Dyfvermark | A61C 17/08 433/93 |
| 5,466,153 | A | * | 11/1995 | Poindexter | A61C 17/08 433/140 |
| 5,924,866 | A | * | 7/1999 | Eldreth | A61C 17/08 433/140 |
| 6,267,591 | B1 | * | 7/2001 | Barstow | A61B 1/247 433/93 |
| 7,238,023 | B1 | * | 7/2007 | Enos | A61C 17/08 433/91 |
| 7,845,944 | B2 | * | 12/2010 | DiGasbarro | A61C 17/08 433/91 |
| 7,938,794 | B2 | * | 5/2011 | Rehman | A61M 1/008 604/35 |
| 10,188,414 | B2 | * | 1/2019 | Ripich | A61B 17/244 |
| 10,667,889 | B2 | * | 6/2020 | Silva | A61C 17/08 |
| 2008/0053434 | A1 | * | 3/2008 | Wightman | A61M 16/0488 128/200.26 |
| 2008/0166684 | A1 | * | 7/2008 | Kanas | A61C 17/08 433/93 |
| 2014/0087328 | A1 | * | 3/2014 | Ronto | A61C 17/08 433/91 |
| 2014/0212838 | A1 | | 7/2014 | Nguyen et al. | |
| 2015/0064646 | A1 | * | 3/2015 | Bombin | A61C 17/08 433/91 |
| 2016/0270890 | A1 | | 9/2016 | Hirsch | |

OTHER PUBLICATIONS

Search Report for Great Britain Application No. GB1617529.1 dated Mar. 1, 2017.
"Review: Zirc's Mr. Thirsty offers affordability, ease of use, effective evacuation and more", Contemporary Products Solutions, http://www.dentalproductsreport.com/dental/article/review-zircs-mr-thirsty-offers-affordability-ease-use-effective-evacuation-and-more.

* cited by examiner third embodiment

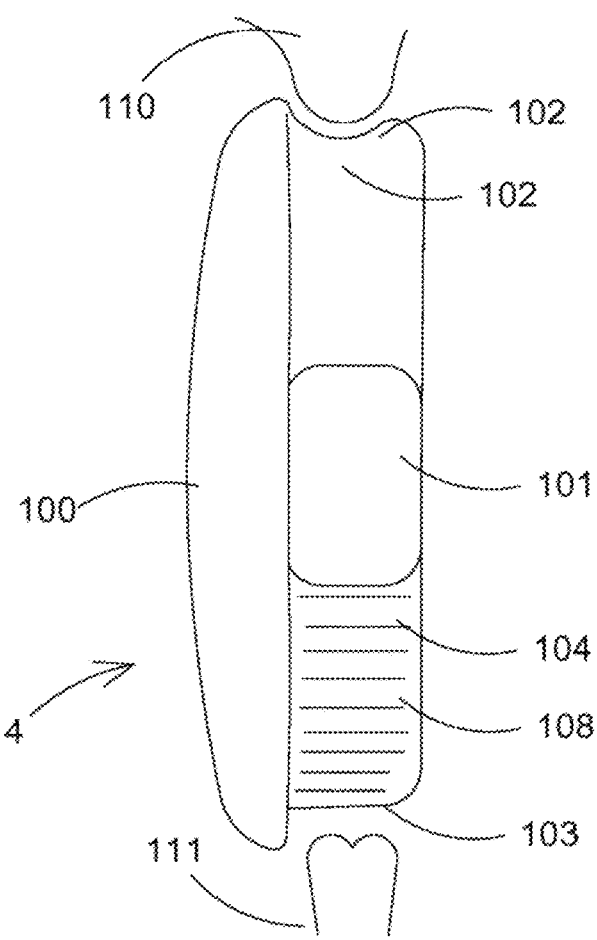
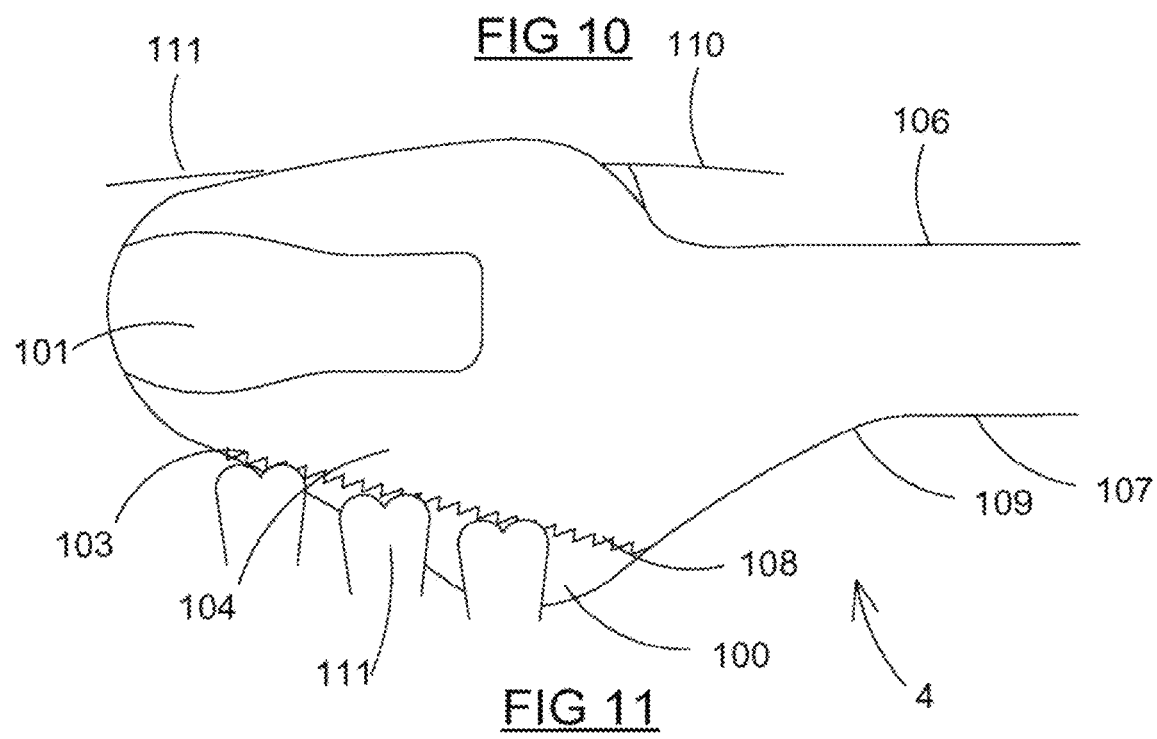
FIG 10
FIG 11

DEVICE FOR REMOVING MATERIAL FROM THE ORAL CAVITY OF A PATIENT

CROSS REFERENCE TO RELATED APPLICATIONS

This application is a national stage filing under section 371 of International Application No. PCT/EP2017/058894, filed on Apr. 12, 2017, published on Apr. 19, 2018 as WO 2018/068901 A1 which claims priority to Great Britain Patent Application No. 1617529.1, filed on Oct. 14, 2016. The entire disclosure of each application is hereby incorporated herein by reference.

BACKGROUND

The present invention relates to a device useful in removing undesired and/or excess material from the oral cavity of a patient.

Suction tubes used for removing such material from the oral cavity are well known in the art of dentistry. Such tubes are sometimes referred to as evacuation tubes or oral evacuation tubes. For ease of reference, the same terminology will be used herein.

High volume evacuation (HVE) tubes are well known in the art of dentistry and are generally used to remove debris from a dental procedure, as well as to remove excess saliva. Low volume evacuation (LVE) tubes are also well known. They are generally used simply to remove excess saliva and are therefore often also known as saliva ejector or saliva evacuation (SE) tubes. They have a narrower bore than HVE tubes and are therefore much more likely to get clogged by debris from a dental procedure than are HVE tubes.

In practice, many dentists simply use HVE tubes, rather than SE tubes, even if it is desired just to remove saliva. This avoids the need to keep two different types of evacuation tube in stock.

Whatever the type of evacuation tube used, it will normally be connected to a suction pump when it is in use. Typically connection is achieved by manually inserting an end of the evacuation tube into/onto connector that is provided at the end of a flexible tube. A dental assistant (such as a dental nurse) will usually use the handle of a connector that connects the oral evacuation tube to a suction device so as to position the oral evacuation tube in the oral cavity in a manner in a manner so that it can be used to remove excess saliva or debris from the oral cavity.

It will be appreciated from the foregoing description that a variety of oral evacuation tubes are known.

It is also well known to use devices known as "mouth props" to keep a patient's mouth ajar during a dental procedure. A commonly used such device is referred to as a "bite block", whereby a patient applies pressure between upper and lower jaws. This is usually done via upper and lower teeth, but sometimes using upper and/or lower gums if teeth are absent in the relevant region(s).

Thus the term "bite" should also be construed accordingly so as to include pressure applied via teeth and/or gums that holds the bite block in position so that the jaws sufficiently apart for a desired procedure to be applied.

Here the bite block acts as a spacer to keep the jaws apart a given distance so that a dental procedure or medical procedure can be performed more easily/better than would otherwise be the case. Despite the name "bite block", there is no requirement that the device actually be block shaped. Indeed any appropriate shape can be used for a bite block, as long as the function of spacing the jaws apart far enough for a desired procedure to be performed is retained.

U.S. Pat. No. 4,957,057 discloses a specialised bite block that is for use in conjunction with endoscopy, bronchoscopy, endotracheal intubation or similar surgical procedures. Here a large, generally "U"-shaped bite block is provided. It is moulded to fit teeth or gums of a patient in such a way that expulsion from the oral cavity is said to be unlikely. It is provided with three bores. Two of the bores are said to be dimensioned to receive endotracheal, oropharyngeal or orogastric tubes and also to provide airways into the oral cavity of a patient when the bite block is in use. The third bore is said to be provided for receiving an appropriate surgical instrument. Here the bite block reduces the risk of a patient accidentally biting upon the aforesaid tubes or instruments.

The large, generally "U"-shaped bite block that is disclosed in U.S. Pat. No. 4,957,057 is contrasted therein with smaller bite blocks that are more usually used in dentistry procedures.

In such procedures a smaller bite block can be provided and positioned between teeth (and/or gums) at one side of the oral cavity so as to prop open a patient's jaws, but still to allow ease of access to teeth and/or gums located at other parts of the oral cavity away from the bite block. Thus, for example teeth or gums at the opposite side of the oral cavity from the bite block (at the right rather than the left hand jaw side or vice versa) and/or at the front of the oral cavity, can be accessed for a given procedure to be performed.

It is also known to releasably connect an evacuation tube to a bite block that is shaped to receive the evacuation tube. This allows the bite block to assist not only in keeping a patient's mouth open, but also to aid in retaining an evacuation in the oral cavity in a desired position. This can free up a dental assistant or other operator to perform other tasks, (rather than holding and positioning the evacuation tube). Indeed, in some instances, a dental assistant may then no longer be required.

An example of such a bite block (referred to therein as a "mouth prop") is provided in U.S. Pat. No. 4,167,814, which was published back in 1979. Here the bite block is referred to as a "mouth prop" and an unusual, substantially rigid, U-shaped suction tube is used. The mouth prop is detachably secured to the U-shaped suction tube by means of releasable clamp that can be in the form of a clip.

Various other combinations of evacuation tubes and bite blocks are also known. For example, U.S. Pat. No. 4,975,057 discloses a bite block having a through aperture that is shaped for receiving a connector that leads towards an evacuation tube. The aperture passes through the bite block in a transverse (width-wise) direction. The bite block is asymmetric in that a lower depending lip is provided at one side of the bite block (the side closest to the tongue of a patient when the bite block is in use) but there is no corresponding lip present at the other side of the bite block (the side closest to an inner cheek when the bite block is in use). U.S. Pat. No. 4,975,057 explains that, given the asymmetric nature of the bite block, it is necessary to manufacture both a right jaw version and a left jaw version of the device.

US 2016/027980 discloses a different intraoral device that includes a bite block and a cheek protector (referred to therein as a "cheek retractor") shaped to contact the inner cheek of a patient at a side or the oral cavity that is opposite to where the bite block is used. A tongue retractor is also included. The device is a complex one, with various channels, apertures and pockets being present. Indeed channels and apertures are present not only in the bite block but also in the cheek protector. The device is said to remove fluids from all areas of the oral cavity. It is provided with a connector that is shaped to connect to a multi-lumen vacuum device. However, as can be seen from the figures of US 2016/027980, the device is bulky and blocks access/makes access significantly more difficult to much of the oral cavity. Furthermore, it can be seen that there is no cheek protector in the vicinity of the bite block. Thus the cheek located closest to the bite block is not protected by a cheek protector.

U.S. Pat. No. 6,267,591 is another example of a somewhat cumbersome device that includes a bite block. The device is provided with an integral extra-oral portion shaped to provide lip retracting surfaces. The extra-oral portion includes a recess that is shaped to receive a thumb of a dental professional, with one or more fingers being positioned on the other side so that the device can be held and manoeuvred. The device further comprises an integral throat dam in the form of a "U"-shaped tube that extends away from the inner cheek of a patient when the device is in use. Various optional components are also described in U.S. Pat. No. 6,267,591 that can be connected to the device, such as an evacuation tube and a fibre-optic rod.

Although various combinations of bite blocks and oral evacuation tubes have been known for many decades in dentistry and surgery, they have generally not found widespread acceptance. As explained above, many such devices are cumbersome to use and position properly. They can also be expensive to manufacture and purchase and in some cases (as discussed earlier) left and right versions are needed for left and right sides of the oral cavity.

Furthermore, they can be uncomfortable/or off-putting for patients, especially ones of a nervous disposition.

SUMMARY OF THE INVENTION

The present invention aims to provide an improved device having a bite block and oral evacuation tube.

According to the present invention there is provided a device for removing material from the oral cavity of a patient during a procedure, whilst also propping the patient's jaws open in a manner that facilitates said procedure, the device comprising:
a) a bite block shaped to be held between upper and lower jaws of the patient at one side of the oral activity in a manner that provides a dental practitioner with access to teeth and/or gums at the opposite side of the oral cavity, without being substantially impeded by the device;
b) an oral evacuation tube, through which material passes when it is sucked out of the oral cavity, the tube being sufficiently elongate so that a part of can be positioned located outside of the oral cavity in a manner so that it can be operably connected to a suction device when the bite block is in use; and
c) a cheek protector shaped to protect an inner cheek area at the same side of the oral cavity as the bite block;
wherein the bite block, evacuation tube and cheek protector are integral, non-releasable parts of the device.

The device can be used in dentistry. However it can be used in any type of procedure (especially medical surgical procedures) where a bite block can be useful. The device can be used in both non-cosmetic and cosmetic procedures. Furthermore it is not limited to use in human patients. It can be used in animals. Thus it can be used for any appropriate veterinary procedures where a bite block is useful.

As explained above, the bite block, evacuation tube and cheek protector are integral components of the device. Thus they are integrated and thus are not arranged to be connected together by a user. This is a very different arrangement from bite blocks that have apertures or connectors requiring the releasable attachment of an oral evacuation tube to a bite block.

The device of the present invention preferably has an integral bore, through which said material passes during removal, with the bore passing through the bite block and the evacuation tube and the bite block having at least one aperture that leads to said bore. Thus the material to be removed can pass through the at least one aperture and into the bore when suction is applied via the suction device. NB: The terms "suction device" and "suction apparatus" are used interchangeably herein to cover any system/product that can be operably connected to a device of the present invention so as to remove material by causing a reduction of pressure in the oral evacuation tube.

(In an alternative, but less preferred embodiment, the bore and any aperture/s leading to it is/are located away from the bite block.)

The bite block desirably has upper and lower bite surfaces that are shaped to receive/be held between upper and lower teeth and/or gums. Desirably these surfaces reduce the risk of the bite block accidentally moving within the oral cavity when the bite block is in use. The upper and/or lower surfaces of the bite block may, for example, be formed from non-slip or reduced slip material (e.g. as a coating or layer). They may be in the form of a plurality of steps, protrusions or ridges that assist teeth and or gums in holding the bite block in place in a manner that resists undesired movement such as slipping or sliding. Thus the bite surfaces can serve so as to increase friction between teeth/gums and the bite block, relative to the situation where specialised bite surfaces are absent.

Whatever the nature of the upper and lower bite surfaces, it is preferred that the bite block is shaped to cause opposing upper and lower teeth of the subject to be spaced apart by a distance of at least 1 cm when the bite block is in use between said upper and lower teeth. More preferably said distance is at least 1.5 cm.

Generally speaking, the larger the spacing the more room that is available for dental or other equipment to be used. On the other hand, it is desirable for the spacing not to be excessively large, otherwise this can be very uncomfortable for a patient.

Thus the spacing between upper and lower teeth achieved using the bite block is preferably less than 4 cm and is more preferably less than 3 cm.

It should be noted that if a tooth is to be treated, it will normally not be a tooth that is used to bite on the bite block (unless it is to be treated at another stage when the bite block has been moved or removed). This is because, as discussed earlier, the bite block is used essentially as a spacer or prop to keeps the jaws open so that a tooth or region located away from the bite block can be treated or examined. The spacing provided by the bite block can therefore improve ease of access of instruments into the oral cavity and viewing of a tooth/region to be treated.

It is preferred that a tooth, or other region to be treated, is at least 1 cm, more preferably 2 cm or at least 4 cm away from the bite block. If required, the bite block can of course be moved to a location further away from the tooth/region.

Indeed it is preferred to locate a bite block at the opposite side of the oral cavity from that of a tooth or other region to be treated. Thus if the tooth/region is at the right hand side (the right jaw region) the bite block may be positioned at the left hand side (the left jaw region) or vice versa.

Alternatively, if the tooth or other region is at/close to the front of the oral cavity, then the bite block can be positioned to the right or left side of the oral cavity, again away from the tooth/region being treated.

The length of the bite block (or of the upper and lower bite surfaces) is not crucial, as long as the bite block can still function well as a bite block but is not unduly bulky. Desirably the maximum length of the bite block (or of the upper and lower bite surfaces) is less than 6 cm or less than 5 cm. More desirably it is between 1 and 5 cm.

Preferably, the upper and lower bite surfaces of the bite block are set at an acute angle to one another. The acute angle is desirably between 5 and 40 degrees. More desirably, it is between 10 and 30 degrees.

Desirably the upper and lower bite surfaces generally converge towards an end of the bite block that is located furthest away from an end of the oral evacuation tube that is used to operably connect the device with a suction apparatus. The bite surfaces may, for example, generally curve, taper, be stepped towards, or otherwise be generally shaped or contoured so as to converge towards the end of the bite block. The end is desirably a rounded or blunt end, rather than a sharp point. (The angle which the bite surfaces converge towards one another is preferably as described above.)

The bore through which material to be removed desirably passes through the bite block preferably lies along an axis that lies midway between upper and lower bite surfaces of the bite block. Indeed the device may be provided in a form that is symmetrical about a plane that passes through said axis. As discussed later, this can be particularly useful in being used at either the right or left side of the oral cavity.

Preferably an aperture is present in the bite block that is at or is close to (e.g. within 1 cm, within 0.5 cm, within 0.2 cm, or within 0.1 cm) of the end of the bite block that is discussed above. Material to be removed can pass through said aperture and into the bore when suction is applied by a suction device.

It is important to note that unless the context is different, the singular does not exclude the plural. Thus terms such as "a, "an", "the", "said", etc., allow for one or more of a given feature being present, unless the context clearly indicates otherwise.

By way of example, the bite block may have a plurality of apertures that lead towards the bore and through which material is removed, although in a preferred embodiment, only a single such aperture is provided in the bite block.

The evacuation tube may itself have one or more apertures through a side wall thereof that also lead to the bore. It is however preferred that, if any such apertures are present, they are smaller (e.g. of lesser maximum diameter than) than any aperture/apertures in the bite block that leads to the bore and through which material is to be removed. Without being bound by theory, the provision of one or more apertures in the side wall may be useful in reducing the risk/extent of aerosol formation (and therefore of cross-contamination) as material is removed through the bite block and evacuation tube.

The one or more apertures in the side wall of the evacuation may be useful in avoiding excess suction being applied through the aperture/apertures in the bite block. Thus aperture(s) in the side wall need not necessarily be used to remove amount of material from the oral cavity (although this is possible). They may function to reduce aerosol formation and/or to modulate suction through the bite block.

Turning now to the cheek protector, this is preferably located to one side of the bite block and shaped so that it can protect soft tissues of the inner cheek from damage, or at least can reduce the risk thereof, when the bite block is in use. It can also help to position the bite block appropriately. Desirably a single cheek protector is present, rather than two cheek protectors. The cheek protector protects soft tissues of the inner cheek that is closest to where the bite block is located. This contrasts, for example, with the arrangement of the device disclosed in US 2016/027980, where the cheek protector is located at the opposite side of the oral cavity from where the bite block is positioned, when in use.

The cheek protector of the present invention can be any desired shape, as long as it helps protect the soft tissues of the inner cheek from damage. Preferably it has a cheek-facing surface that is generally smooth.

When the bite block is in use, the cheek protector desirably protrudes upwards to a level that is higher than that of the upper biting surface of the bite block and/or protrudes downwards to a level than is below that of the lower biting surface of the bite block.

Desirably the cheek protector has a convex outer surface that faces/abuts the inner cheek when the bite block is in use. The cheek protector may be generally rounded/generally oval in shape, when seen from one and side allowing for the fact that it may be fixed to an elongate evacuation tube. It can be considered as a rounded buccal plate. Most preferably it is generally frusto-oval in shape.

It is preferred that the cheek protector does not have an aperture leading to the bore through which material to be removed passes. This can again be contrasted with the cheek protector disclosed in US 2016/027980, which includes an aperture through which material is removed. (Indeed US 2016/027980 provides a bulky device with numerous apertures and is said to remove fluids from all areas of the patient's mouth.)

It is important to appreciate that, although the term "cheek protector" is used herein, this is non-limiting. When the bite block is not in use, the part that could otherwise be used as a cheek protector can therefore be used instead as a tongue retractor.

The term "tongue retractor" is known in the art of dentistry and is used in respect of a device/part that can be used to displace the tongue/part thereof away from an area that is being treated or that can be used to hold down the tongue/part thereof. Typically a tongue retractor will be used to displace the tongue/part of the tongue away from an area being treated so as to provide better access to that area, or a better view thereof. It may, however, simply be used to reduce/control the movement of the tongue/a part thereof, given that excessive movement can make treatment more difficult.

It is also important to note that a patient may find it difficult to control/position the tongue after having received an anaesthetic and there may be a risk of it becoming damaged (or, in extreme circumstances, of a patient swallowing his/her tongue). A tongue retractor is again very useful here.

In any event, the tongue retractor can be used, for example, to allow teeth, gums, surfaces, tonsils or other regions within the mouth to be viewed or accessed more easily than would otherwise be the case. It may also be useful in manipulating the tongue to see parts of it more easily (e.g. to inspect it for ulcers, signs of disease/damage, etc.)

Thus the same part of the device may therefore have two alternative uses—one as a tongue retractor/manipulator and the other as a cheek protector. This is a very different approach from many prior art devices in which a tongue retractor and a cheek protector are provided by different parts of the device.

Given that in a preferred embodiment the cheek protector can be used as a tongue retractor and vice versa, this can reduce the number of instruments needed for a given procedure, as well as the associated expense. It can also help simplify the procedure and reduce the time needed to perform it. In either case the evacuation tube will still be present and can still function effectively to remove excess/unwanted material from the oral cavity.

A cheek protector that can alternatively be used as a tongue retractor use should be shaped so that it is large enough to be used as a cheek protector, but is also small and manoeuvrable enough to be used as a tongue retractor. Thus, for example, when used as a tongue extractor it has a maximum width of at least 1 cm, or 2 cm but less than 5 cm, more preferably of less than 3 cm. The "width" here corresponds to the height when it is used as a cheek protector.

In either event, as discussed earlier, it is desirably generally smooth and free from sharp edges, at least at a region intended to contact the inner cheek or tongue.

Turning now to the bore through which material passes through the device of the present invention, it is preferred that this is at least 4 cm, at least 5 cm or at least 6 cm long. It may, for example, be at least 8 cm or at least 10 cm long.

It is preferably long enough so that one end can be located outside of the oral cavity and operably connected with a suction device. As discussed earlier, desirably the bore passes through both the bite block and the oral evacuation tube. The bite block and evacuation tube are part of the same integral device. This is therefore different from prior art systems in which the bite block is provided separately from the evacuation tube.

Desirably the device is shaped so that it is not necessary to provide left and right hand versions for use at left or right sides of the oral cavity respectively. Thus a single bite block is dual purpose in the sense that it can be used at either side of the oral cavity, unlike, for example bite blocks described in U.S. Pat. No. 4,975,057.

It is preferred that the device is symmetrical or at least substantially symmetrical about a plane that runs through the centre of the bite block, with upper and lower bite surfaces of the bite block being on opposing sides of said plane.

More preferably upper and lower halves of the device (or at least of the bite block) represent mirror images of each other.

Whatever the nature of the device, the device is desirably resilient enough so that when a subject bites upon the bite block to hold the device in place, the bore through which material to be removed does not become blocked or substantially blocked. Thus, for example, it is preferred that the bore does not reduce in diameter by more than 40% when the bite block is in normal use (compared to when no bite is applied). More preferably it does not reduce in diameter by more than 25%, by more than 10%, or by more than 5%.

The bite block is preferably located at/towards one end of the device and, when the device is in use, this end will normally be the end that is furthest back within the oral cavity. For ease of reference, this end can be referred to herein (for convenience) as the "distal end" of the device.

As discussed earlier, the bite block preferably has an aperture that is located at/close to this end of the device. This aperture can be used to remove material from the oral cavity and may sometimes be referred to herein as the "distal aperture".

The other end of the device (i.e. the end that is remote from the distal end) is sometimes referred to herein as the "proximal end" of the device. When the device is in use, the proximal end is located outside of the oral cavity and is operably connected with a suction device so that material can be sucked through the bore described earlier. The proximal end of the bore can therefore be considered to provide a proximal aperture that leads towards the suction device (and is of course much more proximal to the suction device than is the distal aperture located in the oral cavity)

The proximal end of the device may, for example, be shaped to fit onto or into a flexible tube that leads to a suction pump (sometimes also referred to a vacuum pump) may be shaped to engage a connector (e.g. an end piece or nozzle) that is operably connected to such a tube. If desired, a filter and/or reservoir may be provided, whereby material can be collected. The material can be subsequently destroyed or disposed of (e.g. as hazardous waste)

In a preferred embodiment, the proximal end is shaped so that it can be manually pushed into/onto the connector or flexible tube. If a connector is used, the connector may connect directly to the flexible tube of the vacuum pump, or may be connected to one or more other components, e.g. to a handle, that connect to a flexible tube pump. Furthermore, in some embodiments the connector itself may be in the form of a handle that can be easily gripped by an operator.

A stop may even be provided, so that the device cannot normally be pushed beyond a desired limit into/onto the adaptor/flexible tube/handle.

The stop may, for example be, a protrusion, such as a ridge (e.g. a circumferential ridge). Indeed anything that provides substantially increased resistance once parts have been pushed together can be used. The stop may be provided as part the device and/or as part of a flexible tube, handle and/or connector that engages or receives it.

Alternatively, or additionally, an indicator (e.g. a mark or line) may be provided that aids in positioning the device appropriately. In a further option, a user (e.g. a dentist or dental assistant) may simply rely on experience and touch to position the device correctly so that it is operably linked to a suction device.

It is preferred that the device can be manually removed from the connector or flexible tube by pulling it away from the connector/flexible tube/handle. It can then be disposed of or destroyed. Again this would normally be as hazardous waste, which could for example be incinerated.

The device of the present invention is preferably a single use device and is therefore intended to be destroyed or disposed or disposed of after a single use. Thus, for example, it is preferred not to provide it in a form that can be autoclaved or easily reused.

This is not a disadvantage, given that in the preferred aspect of the invention, the device is a low cost disposable device that avoids a potential higher cost and risk associated with obtaining and reusing a reusable device. Indeed the device of the present invention can be used to save both time and money, as well as to improve a dental, surgical or veterinary procedure where a bite block is useful.

The device of the present invention can be made from any desired material. The material may comprise or consist of one or more plastics materials. It may, for example, comprise or consist of polyethylene. This may, for example, be high density polyethylene (HDPE), medium density polyethylene, (MDPE) low density polyethylene (LDPE) or may be any combination thereof. Non-limiting examples of other plastics material that can be used (in addition to, or as alternatives to polyethylene) include fluoropolymers (e.g.

PTFE, PVDF, PFA, & FEP), PVCs, silicones plastics, polypropylenes, polyurethanes, etc. A wide variety of plastics materials can be used.

Preferred plastics materials are those known or approved for use in dentistry. These include medical grade plastics. Such plastics materials are known in the art. They may, for example, be FDA approved and/or by European regulatory authorities. They are provided by many companies, e.g. by US Plastics Corp., where examples are listed at www.us-plastic.com under "Medical Grade Tubing". Some plastics materials may even incorporate antimicrobial agents and can be referred to as "antimicrobial plastics".

The thicknesses of a given material (and/or density) may be varied as appropriate for a given structure, or a part of said structure, as is known by the skilled person This can take into account properties it may be desired to achieve for the device or a part thereof, e.g. strength, rigidity or flexibility, etc.

Other materials (e.g. metals, alloys etc.) may be used or incorporated, but are generally less preferred than plastics materials. It is, for example, possible to make the entire device from another material (e.g. a metal or alloy). However, this is again less preferred than using a plastics material.

In some embodiments it is preferred that the evacuation tube does not bend or distort substantially when it is in normal use. It may, for example, be desired for it not to bend by more than 20 degrees, more preferably by more than 15 or 10 degrees, and most preferably by more than 5 degrees or more than 2 degrees, when it is normal use. Here relatively rigid materials may be used and or/relatively thick walls may be provided. It is also possible to provide reinforcing materials or reinforcing layers for increased rigidity if desired.

In other embodiments, it may be desired that the evacuation tube is flexible whilst keeping the bore open through which material is sucked out of the device. This can be achieved by using flexible tubes, by a concertina-type arrangement (similar to that used for some drinking straws), etc. Many other arrangements are of course possible for imparting flexibility, including providing a relatively thin/flexible wall. It is also possible to provide a flexible tube incorporating a bendable metal/alloy wire, as is known in the art. A flexible tube can be useful, for example, in allowing more flexibility in operably connecting the device to a suction device.

As discussed earlier, it is preferred that the bite block is made of sufficiently resilient material so that a bore in the bite block through which material is to be removed does not become blocked/substantially blocked when the bite block is in normal use. Furthermore, the bite surfaces are preferably made of material that is not so hard as to risk causing damage to teeth or gums during normal use of the bite block.

A wide range of materials can be used to provide these desired properties, such as materials that are used in known gum shields and known bite blocks. They can provide both a desired degree of resilience whilst avoiding unduly hard bite surfaces. It is even possible to provide different materials for different parts of the bite block, although this is less preferred.

Indeed in the most preferred embodiment the bite block and evacuation tube are formed of the same material, or of substantially the same material as one another. Thus it is preferred that the composition of the bite block is homogenous or substantially homogenous with that of the evacuation tube. This simplifies manufacture and keeps down costs. The same applies to the cheek protector.

If additional materials are provided, it is preferred that they amount in total to less than 40% wt/wt, less than 20% wt/wt, less than 10% wt/wt, or less than 5% wt/wt of the device. A reinforcing material is an example of such an additional material. It may be used, for example, to reinforce the bore through which material to be removed passes. Another example of an optional additional material is a cushioning material. This may be used, for example, if it is desired o provide extra cushioning for teeth and/or gums when applying pressure to the bite block.

Turning now to the length of the device of the present invention, it is preferably long enough so that the distal end of the device can be positioned to remove material from towards the rear of the oral cavity, whilst the proximal end is at the same time located far enough outside the oral cavity so that it can be operably connected to an external suction device.

The length (measured from the distal to the proximal end of the device is desirably at least 5 cm, at least 6 cm, at least 7 cm or at least 8 cm. More desirably, it is at least 7 cm, or at least 10 cm. However, if the device is unduly long, it may be difficult to manipulate and to use. It may also be unsightly to patients and will have increased weight. The cost of manufacture and disposal will also increase with length. Thus it is preferred that the total length of the device is less than 25 cm. More preferably, it is less than 20 cm long. Typically it will be about 15 cm long, although this is of course not limiting. (NB: All dimensions discussed herein are those preferred for adult humans. If desired, they may be adjusted accordingly if the device is for veterinary use and/or for use with children or infants.)

As discussed earlier, a distal aperture is preferably provided and located at/close to a distal end of the bite block More preferably this aperture extends from the distal end of the bite block and through a side wall thereof. (Desirably it extends through a side wall on the opposite side of the bite block to where the cheek protector is located.) It may for example extend from the end of the bite block at least 2 mm, at least 3 mm, at least 4 mm, at least 5 mm, at least 6 mm, at least 7 mm, at least 8 mm or at least 9 mm along said side wall. Indeed the larger the aperture the less likely it is to become blocked with debris. Preferably the distal aperture is as large as the bore that it leads to.

Desirably the evacuation tube comprises one or more additional apertures that are located in the side wall of the evacuation tube. Although in some cases this arrangement may be used to suck additional suction of material from the oral cavity, it may simply be used to reduce aerosol formation and therefore reduce the risk of cross infection. Here the apertures may be relatively small. Thus, if one or more such apertures are provided, it is therefore preferred that they are smaller than the distal aperture of the device. Preferably any aperture in the side wall of the evacuation tube is at least 50% or at least 75% smaller (e.g. in width) than the distal aperture of the bite block.

Desirably there are at least two, or at least four, apertures in the side wall of the evacuation tube. Preferably, there are less than twenty (e.g. less than ten) such apertures.

Turning now to the inner bore of the evacuation tube, this preferably has a diameter of at least 5 mm. More preferably it is at least 6 mm, at least 7 mm, at least 8 mm or at least 9 mm. Such tubes are generally known as high volume evacuation tubes (HVE tubes), as discussed earlier. (The inner bore is preferably less than 25 mm and more preferably less than 20 mm or less than 15 mm in diameter. If the bore is very large then the evacuation tube can become unduly and difficult to manipulate. Suction can also reduce in intensity as the size of the bore increases.)

HVE tubes can be contrasted with LVE tubes, which have smaller bores and are typically used to remove excess saliva rather than to remove debris from dental work, as again discussed earlier. The invention covers utilising both HVEs and LVEs as evacuation tubes in the present invention. In each case the evacuation tune forms part of an integral single product in which the evacuation tube, bite block and cheek protector are present.

The bite block can be held under pressure between upper and lower teeth. However in some embodiments some or all teeth may be missing. (This is referred to in dentistry as being partially or completely "edentulous".) If no teeth are present, a bite block may simply be held in place between upper and lower gums that apply pressure to the bite block. Here the "bite" is applied by opposing gums. Alternatively, teeth may be present above the bite block, but not below, or vice versa. Thus a combination of upper or lower teeth and an upper or lower gum may be used to hold the bite block in place. Again a gum may contact the bite block and the term "bite" should be interpreted accordingly.

The present invention therefore includes a device as described herein in which the bite block is shaped for a subject who has teeth missing. The bite block may, for example, be shaped to be held between an upper or lower gum of the subject and lower or upper teeth respectively. Here the bite block may include a channel/groove/recess for receiving a gum and may include a bite surface shaped for contacting teeth.

If there are no teeth in the relevant region, then the bite block may simply be shaped to be held between upper and lower gums of the subject. Here upper and lower channels may be provided shaped for receiving/contacting upper and lower gums respectively. The actual shapes of the gums will vary from patient to patient. Thus a given recess/groove/channel does not need to fit a gum exactly or even snugly. It is enough that it functions to hold the bite block in place during use. The provision of a recess/groove/channel here can help improve the comfort of a patient, compared to a flat planar surface or a roughened surface.)

In some cases a layer of cushioning material (e.g. a soft foam material) may be provided for contacting the gum. However, as discussed earlier, it is preferred that the material of the device is homogenous or substantially homogenous. This keeps the design simple and helps keep costs down. Thus it is preferred that layers of different materials are not provided.

Indeed a homogenous or substantially homogenous material may be used for the device that already allows a degree of cushioning/deformation in the given areas (e.g. it may be resiliently deformable at said areas).

If teeth are missing in the region where a bite block is to be placed and one or more gums are therefore used to exert a "bite" on the bite block then it is the size and shape of the bite can be adjusted accordingly. Thus, as discussed above, where a gum is present, the bite surfaces can be shaped for contacting the gum (e.g. shaped for receiving part of the gum).

Here the bite surfaces may be further apart than would be the case for upper and lower bite surfaces of a bite block used to contact upper and lower teeth. Thus, for example, in these embodiments the upper and lower bite surfaces are desirably set at least 0.5 cm, at least 1 cm, or at least 2 cm further apart than would be the case for a bite block where the bite surfaces contacted teeth.

(In all embodiments of the invention the upper and lower bite surfaces are preferably at least 1 cm or at least 2 cm apart. The measurements of the distance "apart" given herein for the bite surfaces are used to indicate the maximum spacing of the bite surfaces from one another. It should be noted here that the bite surfaces are not necessarily parallel to one another, as can be seen from the figures that are described later.)

The key point is that the bite block functions as a spacer and in whichever embodiment it is used it should allow the jaws to be far enough apart so that a desired procedure (e.g. a dental operation) can be conveniently performed.

It will be appreciated that a wide variety of devices are within the scope of the present invention. Although many variants are possible, in a preferred embodiment the device is generally tubular in shape, but has an enlarged end portion where the bite block and cheek protector (if a cheek protector is present) are located.

In this preferred embodiment it is desired that, apart from any bite surfaces, the enlarged end portion is generally smooth so as to reduce the risk of damage to soft tissue.

Although the enlarged end portion will be wider than the evacuation tube, it is preferred that the maximum width of the enlarged end portion is no more than five times or more than four times the maximum width of the evacuation tube. More preferably it is no more than three times or no more than two times said maximum width. This allows for ease of manipulation and means that the design of the device can be kept compact, which is useful if the device is also used as a tongue retractor (as discussed earlier)

The present invention also includes a device as described herein, when operably connected to a suction apparatus.

The device may be provided in single use, disposable form. Thus it need not be provided in a form that can be easily autoclaved, sterilised or disinfected after use. It may be provided with instructions or labelling indicating that it should be used only once.

Also within the scope of the present invention is a method of manufacturing a device of the invention preceding claim comprising manufacturing said device in a form without any removably mounted parts.

The method may comprise a moulding process and/or it may comprise an extrusion process. It may comprise forming a plurality of parts and fixing them together (e.g. by fusion or by adhesive) in a non-releasable form so that a unitary device is provided. The device can therefore be formed by a wide variety of methods.

It can also be used in a number of procedures, as discussed earlier. It can be used for therapeutic purposes, e.g. in dentistry, in general surgery and/or in veterinary surgery.

Preferably however it is used in a dentistry procedure performed on a human subject, e.g. providing a filling, crown, cap, implant, extraction or performing a check-up or diagnosis. It can even be used as part of a cosmetic procedure (e.g. teeth whitening or any other cosmetic procedure), given that it will still be useful in removing debris/excess material from the oral cavity.

As discussed earlier, the material to be removed may be excess saliva or debris from within the oral cavity, or indeed any material it is desired to remove. Such material may be disposed of (e.g. as clinical waste).

Another use of the device is in removing material that is to be analysed at a later stage. It may, for example, be used to remove saliva, cells, tissue and/or pathogenic material tissue that is subsequently analysed. The analysis may be used to assess if a subject is suffering from an infection or condition or to assess the risk thereof. Thus it may be used for diagnostic or prognostic purposes. Material that is removed may however be analysed for any purpose. For example DNA may be extracted from biological material and may be used to assist in identifying an individual or to provide useful information regarding that individual (e.g. to examine inherited traits).

The device therefore has many applications. It may be used to remove material from the oral cavity of a human or non-human animal, to remove it from an adult or juveniles, etc. (In the case of a juvenile the device can be scaled down appropriately.)

If desired, the device may be provided as part of a kit. For example it may be provided as part of a kit comprising one or more of the following: an adaptor (e.g. a connector), a suction pump, a flexible tube, instructions for single use and/or disposal of the device, a container in which the components are packaged, one or more further devices of the present invention, etc.

Preferably the device (or a plurality of such devices) is provided in a sealed package. If desired, it can be provided in a sterile or non-sterile form within the package. This may depend on the type of procedure being carried out. (It should in any event be noted that once a sterile package is open the device will no longer be sterile and it is not essential for most purposes that it be sterile, as long as good hygiene procedures are used.)

BRIEF DESCRIPTION OF THE DRAWINGS

The present invention will now be described by way of example only, with reference to the accompanying drawings, wherein:

FIG. 1 is a frontal view of the distal end of the device.

FIG. 2 is a side view of the distal end of the device showing a cheek protector in the form of a buccal plate (which can also be used a tongue retractor).

FIG. 3 is a view of the distal end of the device taken from the opposite side to that shown in FIG. 2, so that a bite block can be seen, as well as a distal aperture (which extends around this side).

FIG. 4 is a view from above of the distal end that is shown in FIGS. 1 to 3 and allows an upper bite surface to be seen, as well as the convex nature of the cheek protector.

FIG. 5 is a frontal view of the distal end of the device of the second embodiment.

FIG. 6 is a view from above of the distal end of the device of the second embodiment. It shows a channel for receiving a gum, as well as the convex nature of the cheek protector.

FIG. 7 is a view from one side of the distal end of the device of the second embodiment and allows the bite block to be seen, as well as a distal aperture (which extends around this side).

FIG. 8 is a frontal view of the distal end of the device of the third embodiment.

FIG. 9 is a view from one side of the distal end of the device of the third embodiment and allows the bite block to be seen, as well as a distal aperture (which extends around this side).

FIGS. 10 and 11 show a fourth embodiment of a device of the present invention. This embodiment is intended to be used where a where a patient is partially edentulous in a region where a bite block is to be used. Here the bite block is designed to be held between lower teeth and an upper gum (i.e. the reverse of the situation in the third embodiment).

FIG. 10 is a frontal view of the distal end of the device of the fourth embodiment.

FIG. 11 is a view from one side of the distal end of the device of the fourth embodiment and allows the bite block to be seen, as well as the distal aperture (which extends around this side).

FIG. 13 shows the device of FIGS. 1 to 4 when in use in the oral cavity. Here the device is located at the right hand side of the oral cavity (from the patient's perspective), i.e. between upper and lower teeth of the right jaw. The dotted lines show the location of a channel through which material is removed from the oral cavity via the device.

DETAILED DESCRIPTION

Figure 1:
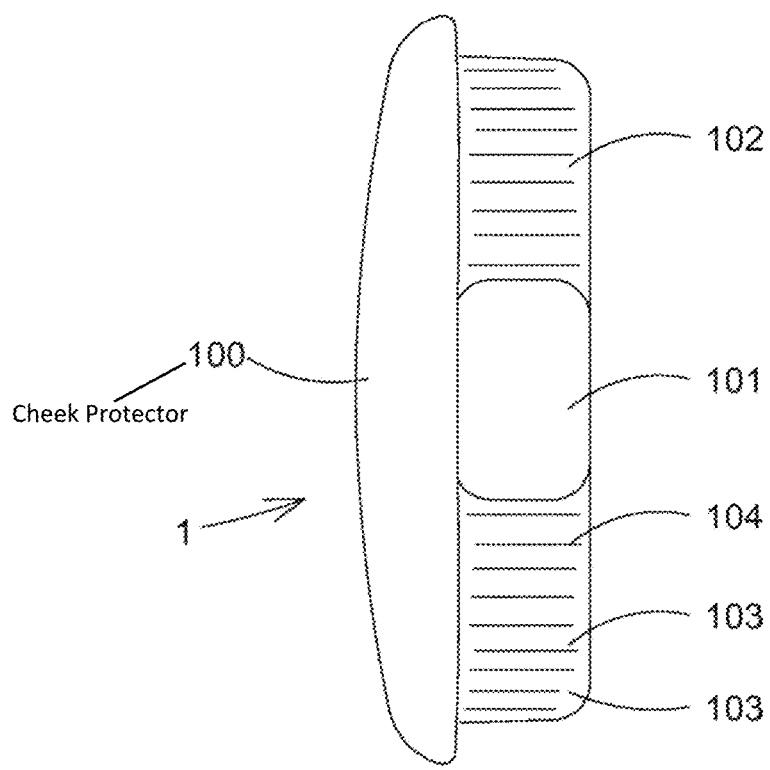
FIGS. 1 to 4 and 13 illustrate a first embodiment of the device of the present invention; wherein the bite block is intended to be held between upper and lower rows of teeth (i.e. where a patient is fully dentate in a region where a bite block is to be used).
Figure 2:
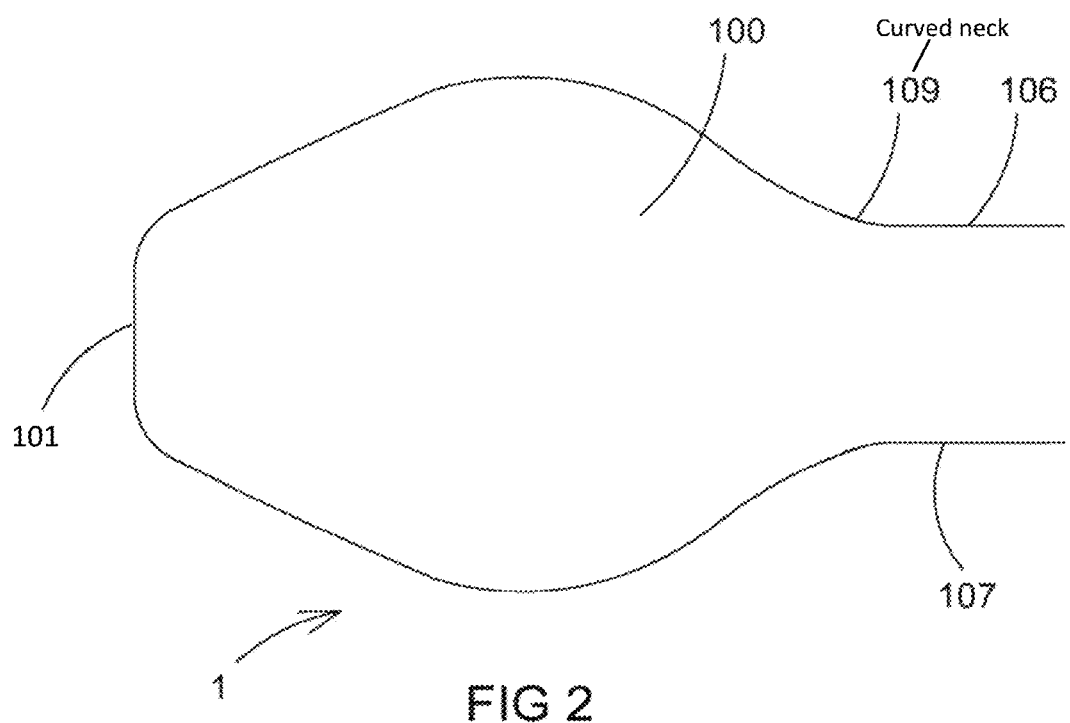

Corresponding reference numbers have been used in the examples and figures for ease of reference, where this is appropriate. Thus, for example, the same reference number is used for a bite block in all of the examples.

Example 1

First Embodiment

Device where a Patient is Fully Dentate in a Region where a Bite Block is to be Used This is a first embodiment of a device 1 of the present invention. Here a bite block 104 is provided that is shaped to be held between upper and lower rows of teeth of a subject undergoing a procedure within the oral cavity. The procedure may be a dental procedure, although the device 1 can be used for any desired procedure where it is desired to remove material from the oral activity. This embodiment is illustrated by FIGS. 1 to 4, 12 and 13.

The device 1 includes a buccal plate 100, which is also referred to herein as a cheek protector (although it is not limited to such a use, as discussed later). The buccal plate 100 is smooth to reduce the risk of trauma to the soft tissues. It has a convex outer surface, so as to complement the natural anatomy of the buccal mucosa. This allows a good fit and also provides comfort to the patient during use. It is streamlined in shape and curves via a gradually curved neck 109 towards a wall 106 of the oral evacuation tube 107. The streamlined shape helps prevent/reduce trauma or irritation to adjacent tissues and improves patient comfort.

In use, the buccal plate 100 can extend into the upper and lower buccal sulcus and can be kept in in place by the buccal mucosa on the outside and the buccal walls of the upper and lower posterior teeth on the inside. The buccal plate 100 is relatively thin, compared to the height thereof, as can best be seen from FIG. 1. It therefore does not displace buccal soft tissues to any extent that would be expected to cause substantial discomfort or trauma to a patient.

Figure 12:
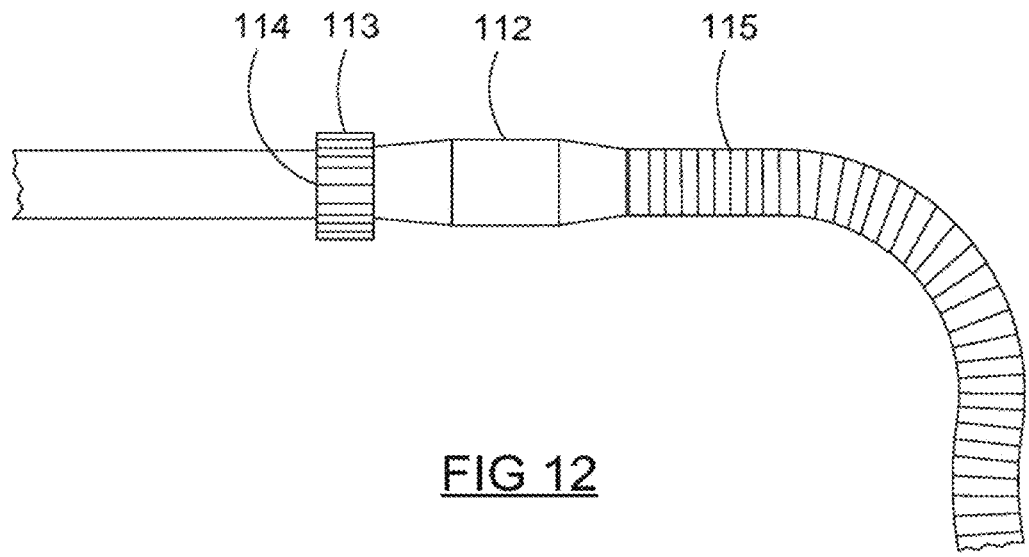
FIG. 12 shows the proximal end of a device of any of the above-mentioned embodiments, when inserted into an end piece that operably connects the device to a flexible tube of a suction apparatus. A handle can also be seen, which is used to manipulate a device.

The buccal plate 100 can also be used as a tongue retractor (when it is not used as a protective buccal plate/cheek protector). The buccal plate 100 should therefore be wide enough to be suitable for manipulating the tongue when this part of the device is used as a tongue retractor, but not so wide that it cannot be easily manipulated into place when it is used as a cheek protector for a bite block 104. (In the latter case, after the device 1 has been positioned appropriately, a patient will bite upon the bite block 104 and this will hold the bite block 104, cheek protector 100 and oral evacuation tube 107 in place until the bite is released When the device 1 is moved within the oral cavity, an operator (e.g. a dental surgeon or nurse) will normally hold a handle 112 that is operably connected to the device. The handle 112 can be seen in FIG. 12. An end piece 113 can also be seen here that into which the proximal end 114 of the device has been inserted. A flexible tube 115 is also shown in FIG. 12 that leads towards a waste collection system (not shown) where material is collected for disposal. (Alternatively, it may lead to a drain for hazardous waste.)

The same arrangement as shown in FIG. 12 can be used for the other embodiments described herein. Thus the device 1 can be engaged by the end piece 113 shown in FIG. 12 and the handle 112 can be used to manipulate and position the device 1.

Material that is to be removed from the oral cavity passes through a distal aperture 101 (also referred to herein as the suction aperture) of the bite block 104. It then passes through a central bore 116 (not shown in FIGS. 1 to 4 and 12, but shown in FIG. 13 via dotted lines) and exits the device via a proximal aperture (not shown) so that it can proceed towards a suction device where it is collected for disposal.

The distal aperture 101 is large enough to collect most forms of debris that are normally encountered during dentistry, whether the debris be saliva, blood, debris from dental hard/soft tissues or material used in dental treatment. If, however, larger pieces of material are present they can be removed via tweezers, for example.

Figure 3:
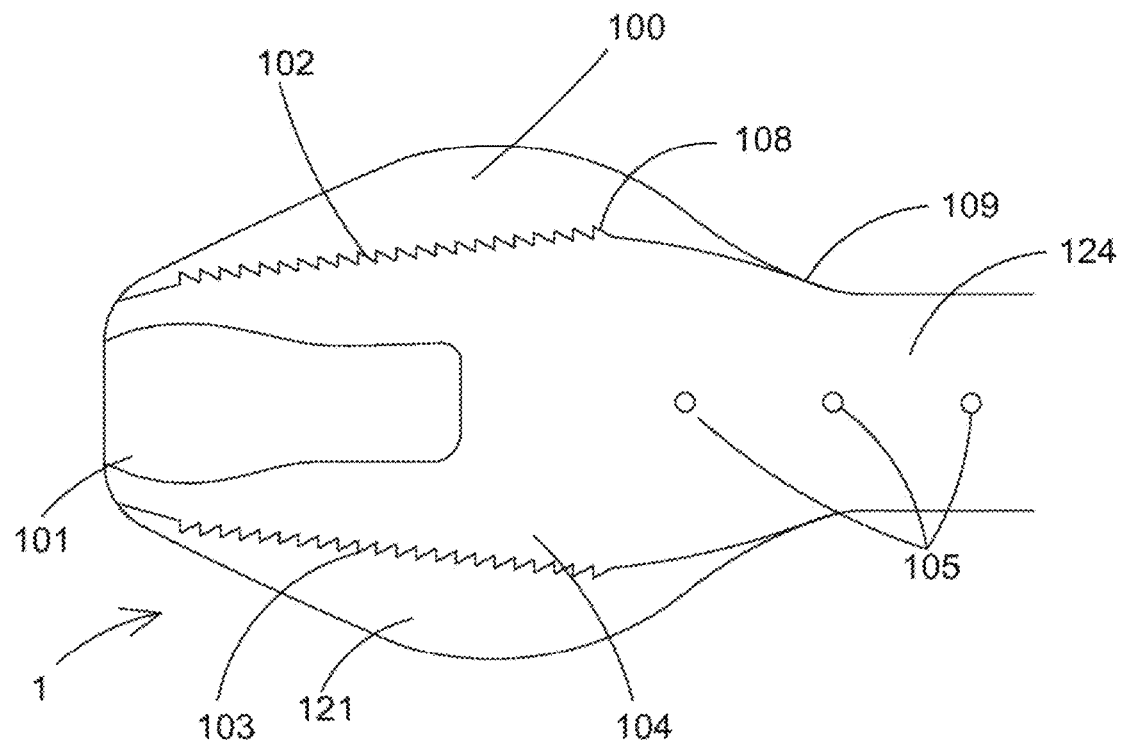
Figure 4:
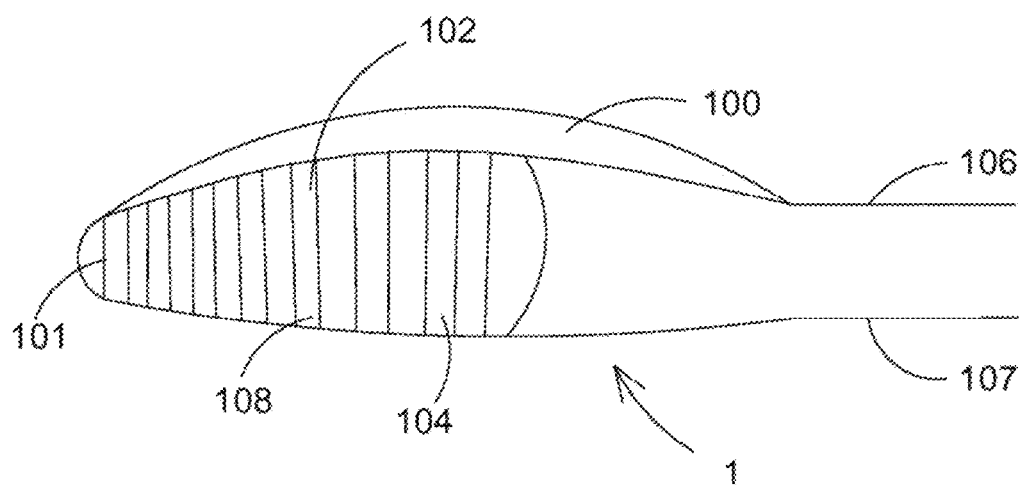

As can be seen from FIG. 3 (which can be considered as a lingual view) the distal aperture 101 extends along a side of the device 1 that is opposite to the side where the cheek protector 100 is located. A large opening is therefore provided by distal aperture 101. The size and location of this opening reduces the chances it will become clogged.

Several smaller apertures 105 are also provided. These are perforations in the side wall 106 of the oral evacuation tube 107 and lead towards the internal bore 116 of the device 1. They can assist in reducing the risk/extent of aerosol formation. (In other embodiments, which are not shown, they may be larger and positioned to facilitate additional removal of debris from the oral cavity. However this is less preferred.)

Turning now to the bite block 104, this has upper 102 and lower 103 bite surfaces. They are in the form of spaced ridges/steps 108 and function to prevent/reduce undesired movement when the device 1 is held between upper and lower teeth that apply pressure to the upper and lower bite surfaces 102, 103. (Any other means that prevent unwanted movement can of course be used instead, e.g. non-slip surfaces, a roughened surface, etc.)

The upper 102 and lower 103 bite surfaces allow the device 1 to remain in situ between the jaws of a patient until it is desired to remove it and the patient is told to release the bite. The upper 102 and lower 103 bite surfaces are preferably provided at an acute angle to one another, given that upper and lower teeth are hinged via the jaw and will also be at an acute angle to one another when the jaw is opened. The upper 102 and lower 103 bite surfaces can therefore be used to achieve a suitable spacing between the maxilla and mandible when the bite block is in use.

In general terms, the further posterior the bite block 104 is placed within the oral cavity, the wider the jaws can be opened. However, in practice, it will cause discomfort if the jaws are opened to an undue extent. Thus the device 1 can be sized and/or positioned appropriately to facilitate patient comfort. (If desired a plurality of different sizes may be provided, e.g. via a kit comprising several devices)

When the bite block 104 is held in place by the teeth of a subject biting upon the bite surfaces 102 and 103, a nurse (or other operator who might otherwise hold the evacuation tube 107 in place) can carry out tasks, e.g. mixing/preparing materials, selecting dental instruments, etc. This can all be done whilst the oral evacuation 107 tube functions to remove saliva/debris from the oral cavity.

This can lead to significant improvements in efficiency. It is important to note that, although it is preferred that upper 102 and lower 103 bite surfaces are at an acute angle to one another, this is not essential. In some embodiments they may be parallel, or substantially parallel, to one another.

The key point is that the bite block 104 functions to prop the jaws apart during a procedure performed within the oral cavity. It can help a patient to relax, compared to a situation where no bite block is present. If there is no bite block 104, a patient may have to guess how far to open his/her jaws and will normally have nothing to rest his/her the teeth on. The bite block 104 can therefore help reduce patient fatigue. In particular, it can help reduce tension in tempero-mandibular joint and associated muscles and/or associated muscles compared to a situation where no bite block is used.

The use of an integral bite block 104 can also speed up the procedure/simplify it, given that it is not normally necessary to stop the procedure many times to allow a patient to relax (or at least is not as likely as would be the case if a bite block 104 were absent) and/or to remove material from the oral cavity, given that the oral evacuation tube 107 is held in place by a patient biting on the bite block 104.

The bite block 104 can help an operator to perform out work in the oral cavity without the risk of a patient closing his/her mouth unexpectedly during the procedure. Thus safety can be improved, both for the operator and for the patient.

Given that the bite block 104, oral evacuation tube 107 and cheek protector/tongue retractor 100 are integrated together in a single device 1, the number of devices required for a procedure can be reduced.

Figure 13:
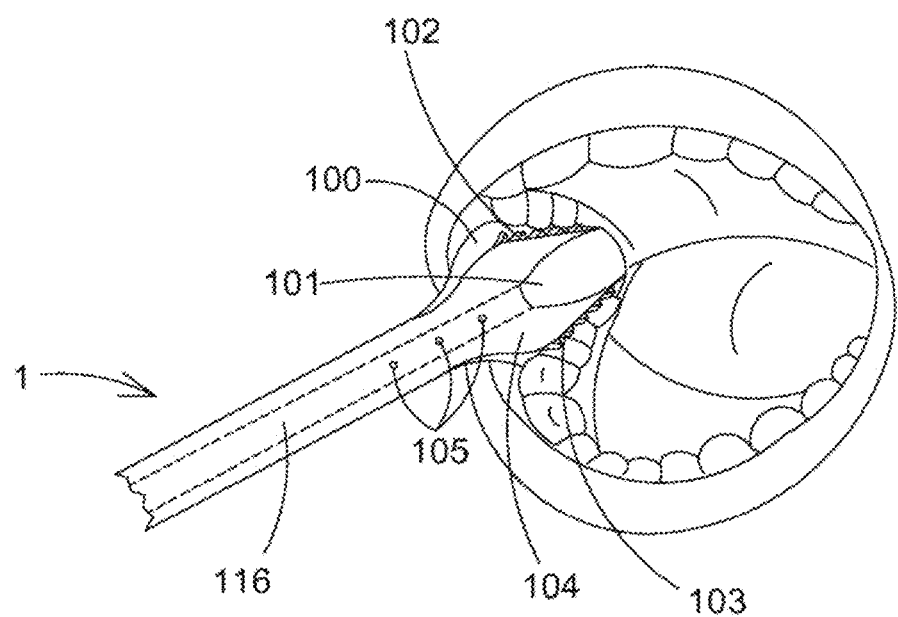

FIG. 13 is particularly useful in showing the device 1 in use. It can be seen that it only occupies a small part of the oral cavity (here the right side). A dentist or other operator can easily access teeth/gums at the opposite side of the oral cavity and at the front thereof. Thus, for example, front teeth/gums and left hand side teeth/gums can be accessed for a dental procedure. In the view shown the upper and lower bite surfaces 102, 103 of the bite block are contacted by upper and lower teeth respectively of the left hand jaw.

A large aperture 101 in the bite block 104 can be seen, through which material to be removed passes when a suction apparatus to which the device 1 of the present invention is operably connected is actuated. The material (e.g. saliva and debris from a dental procedure) proceeds down the central bore 116 under suction towards a waste collection part of the suction apparatus. A cheek protector (buccal plate) 100 can be seen. This is positioned at the opposite side of the bite block 104 and, unlike the bite block 104, has no aperture passing through it towards the central bore 116. It has a convex outer surface, as can be seen in FIG. 1.

Apertures 105 in the side wall of the evacuation tube can also be seen in FIG. 13. As discussed earlier, they can help regulate the suction applied through the aperture 101 in the bite block 104 and can help reduce the risk/extent of aerosol formation. Although the device 1 is shown in FIG. 13 at the right hand side of the oral cavity, it could equally be positioned instead at the left hand side of the oral cavity, with the bite block 104 held between upper and lower left teeth and the cheek protector 100 facing soft tissue of the inner right cheek. Thus the same device 1 can be used at either side of the oral cavity by turning it through 180 degrees and moving it accordingly. A single device 1 can thus be used at either side of the oral cavity and it is not necessary to provide different left and right versions. (This is facilitated by the device 1 being symmetrical from top to bottom about a plane between upper 102 and lower 103 bite surfaces.)

It is also important to note that the device 1 is compact and simple to use and position. Unlike many prior art devices it leaves most of the oral cavity easily accessible and viewable, even when the bite block 104 is use. This allows dental and surgical instruments to be easily used, check-ups and diagnoses to be made, operations to be performed, etc., all without being impeded by a bulky device.

Example 2

Second Embodiment

Figure 5:
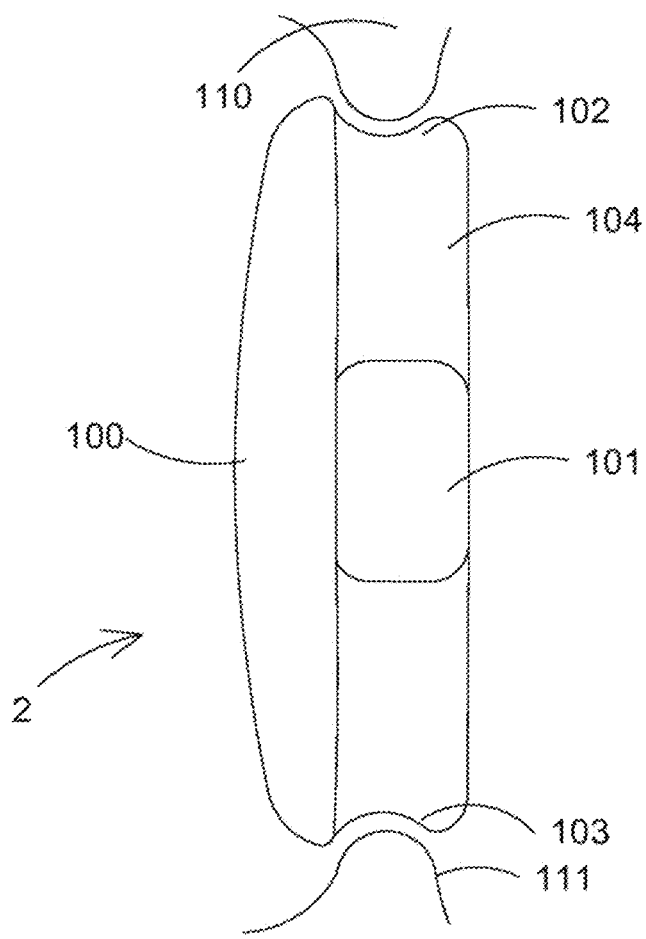
FIGS. 5 to 7 show a second embodiment of a device of the present invention. This embodiment is intended to be used where a patient only has gums in the region where the bite block is to be used (i.e. where a patient is fully edentulous in a region where a bite block is to be used).
Figure 6:
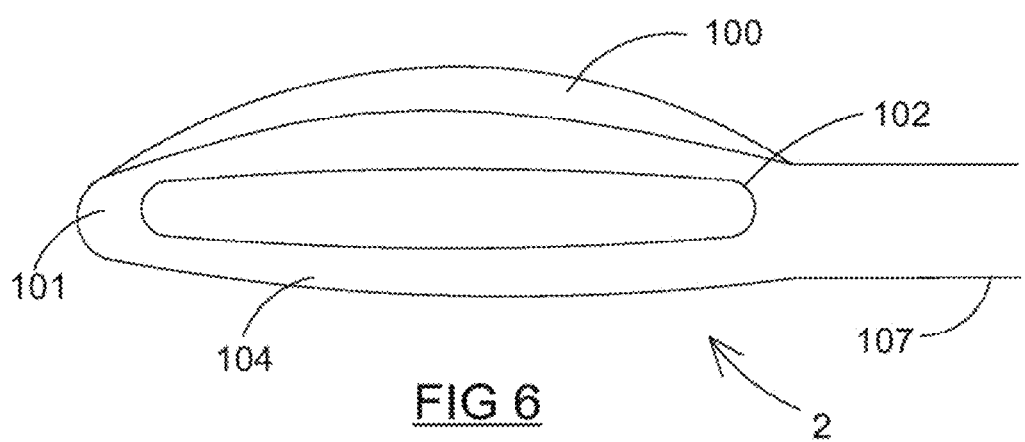
Figure 7:
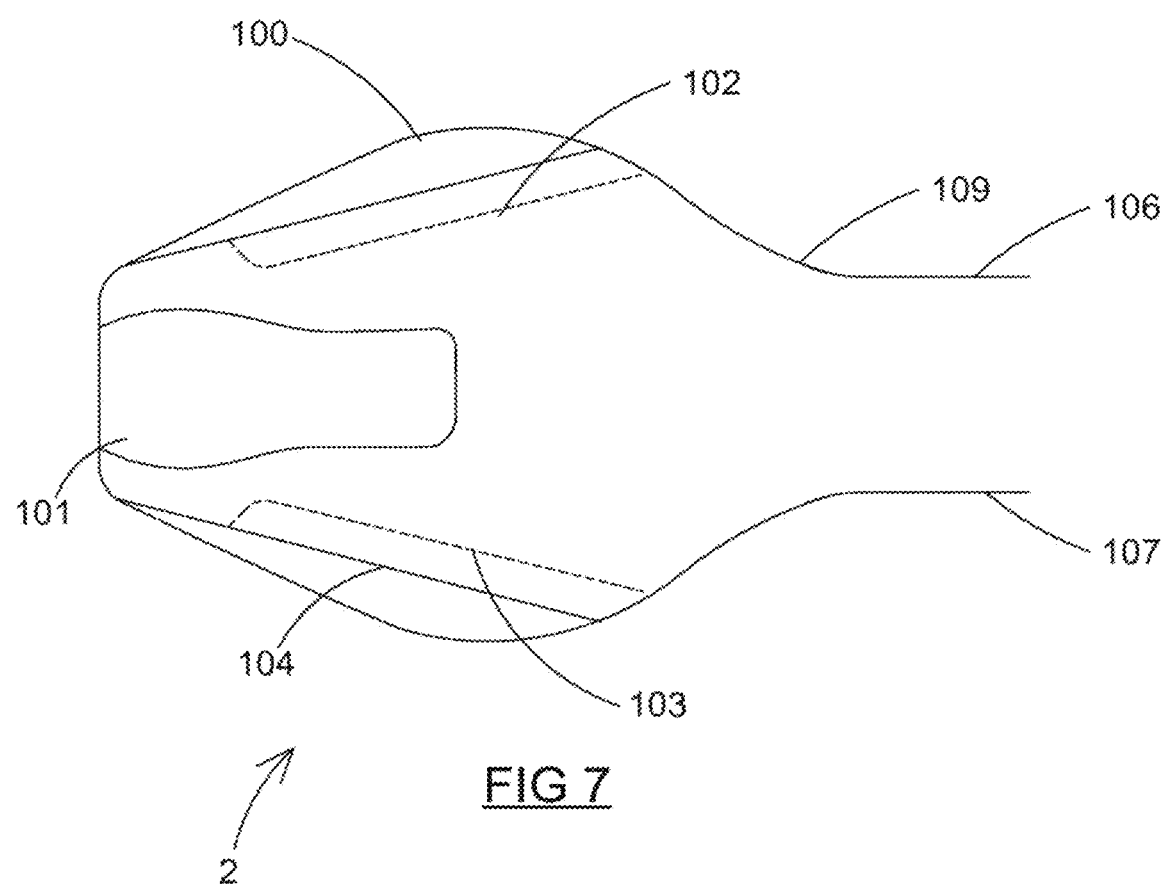

Device where a Patient is Edentulous in a Region where a Bite Block is to be Used This device 2 is similar in various respects to the device 1 discussed in Example 1. The main difference is that in Example 2, which is illustrated by FIGS. 5 to 7, the upper 102 and lower 103 bite surfaces of the bite block 104 are formed by generally concave channels or grooves that receive upper and lower gums 110, 111 (rather than ridges that engage upper and lower teeth). The channels/grooves are shown in FIGS. 5 and 6 and are illustrated by dotted lines in FIG. 7.

In this example the device 2 is held in place by gums 110, 111 (also known as the maxillary and mandibular edentulous ridges) that fit into channels and apply pressure to the bite block via said channels. For the purposes of the present invention this pressure is considered to be a "bite" on the bite block 104. Although teeth are absent in the region of the bite block 104, the distance between the upper and lower bite surfaces 102, 103 can be tailored to compensate for this, thereby to allow a given spacing to be achieved and/or to allow the jaws to be held apart at a given angle. (In further alternatives, the upper and lower bite surfaces are not in the form of channels that receive gums, but are provided as smooth surfaces/as cushioning/as deformable material upon which the gums can exert pressure. Many alternatives are possible, as long as the bite block can be held in place by the gums.)

In this embodiment it can be seen the upper and lower edges of the buccal plate (cheek protector) 100 do not extend as far into the buccal sulcus as was the case for the embodiment of Example 1. This is due to the lack of teeth creating a shallower sulcus depth. The buccal plate 100 rests on soft tissues at a depth that prevents any lateral movement. This device 2 can be used during oral surgery involving the soft tissues, bone or in implant placement and restoration, etc. It should be noted that in this and in other examples where gums are illustrated, the gums are shown very schematically. The actual shapes of the gums will vary from patient to patient. If a recess/groove/channel 102, 103 is provided for receiving an upper/lower part of a gum then it does not need to fit the gum exactly or even snugly. It is enough that it functions to hold the bite block 104 in place during use. (The provision of a recess/groove/channel can help improve the comfort of the subject compared to a flat planar surface or a roughened surface.)

In this example the device 2 is symmetrical from to bottom, with the upper half being a mirror image of the lower half. It can be used at either side of the oral cavity, if only gums are present where the bite block 104 is to be located. (It should of course be recalled that the term "bite" includes pressure exerted by gums, if teeth are not present, and the term "bite block" 104 is also construed accordingly)

Example 3

Third Embodiment

Device where a Bite Block is to be Held Between Upper Teeth and a Lower Gum

In this embodiment a patient is partially edentulous, having lower teeth missing in the vicinity where the bite block is to be used, but having upper teeth 110 present. This embodiment can in some respects be considered a mixture of the embodiments discussed in Examples 1 and 2. (Again, corresponding reference numbers have been used, where appropriate).

Figure 8:
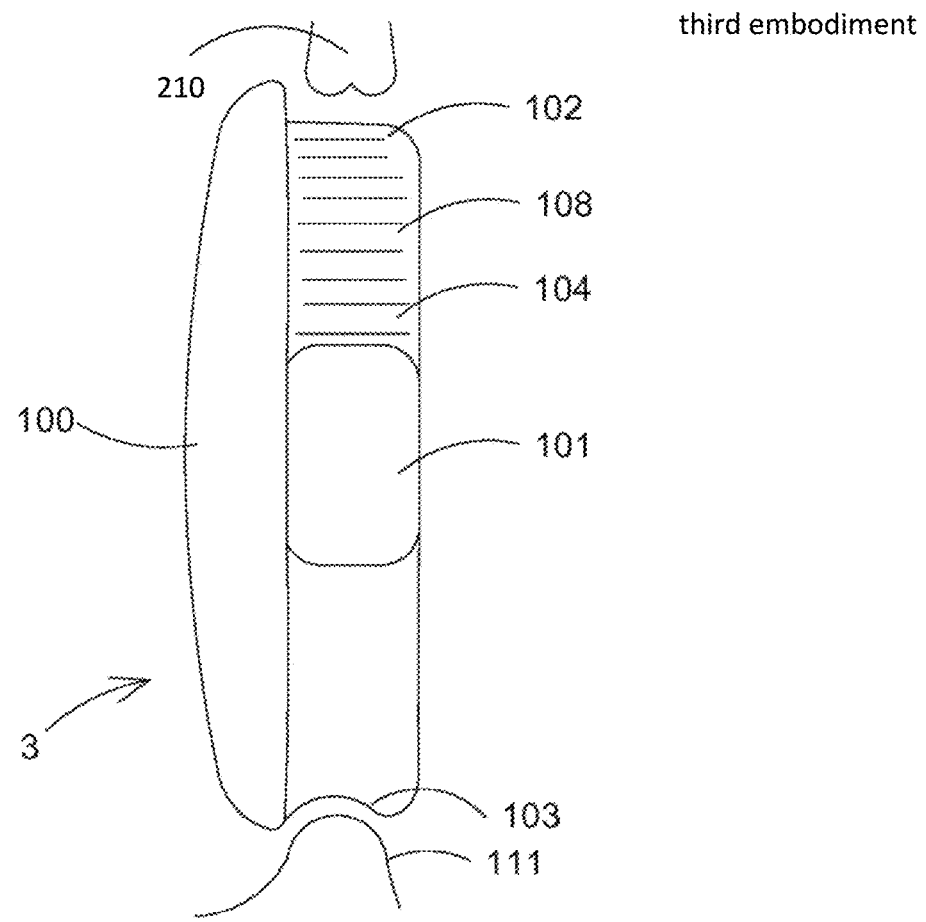
FIGS. 8 and 9 show a third embodiment of a device of the present invention. This embodiment is intended to be used where a where a patient is partially edentulous in a region where a bite block is to be used. Here the bite block is designed to be held between upper teeth and a lower gum.
Figure 9:
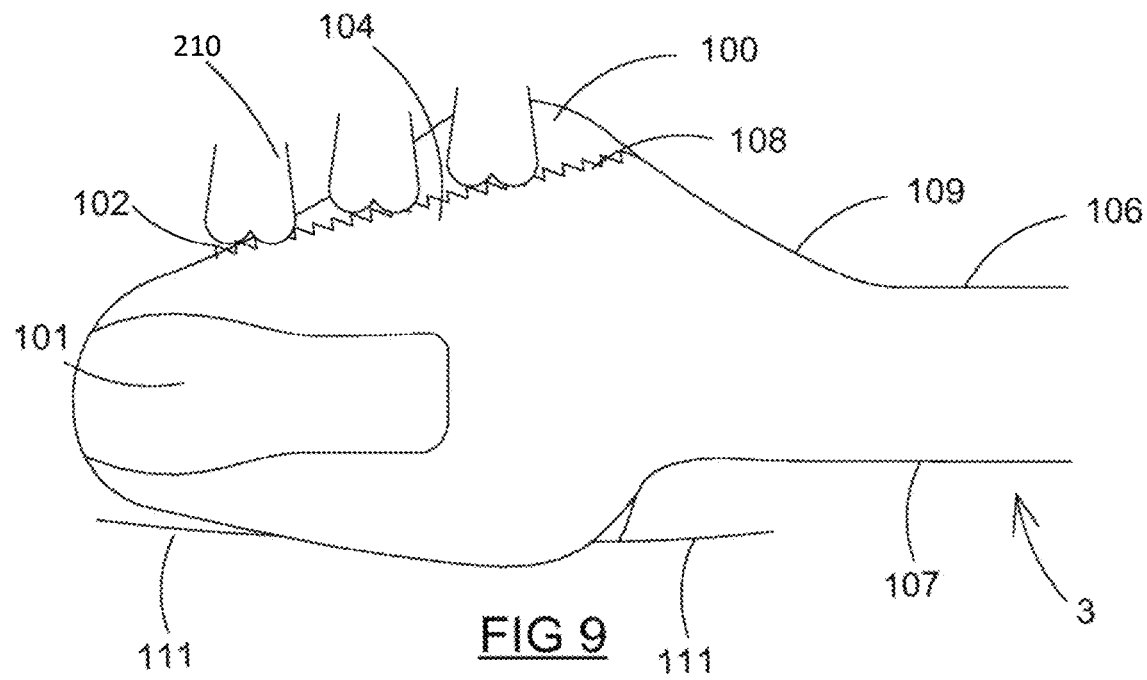

As can be seen from FIGS. 8 and 9, the bite block 104 of the device 3 is held in place between upper teeth 110 and a lower gum 111. The upper teeth 110 contact ridges 108 of a bite block 104 at the upper bite surface. The lower gum 111 fits into a recessed channel that forms the lower bite surface 103.

(Other alternatives are possible. The lower bite surface 103 does not have to be part of a channel that receives the gum, but may be a generally smooth surface/may be in the form of cushioning and/or may be in the form of deformable material upon which the gum can exert pressure. Indeed, many alternatives are possible, as long as the bite block 104 can be held in place.) The distance between the upper and lower bite surfaces 102, 103 can be set accordingly to achieve a desired spacing. Thus due account can be taken of the absence of teeth underneath the bite block 104.

As can be seen from FIG. 9 the buccal plate/cheek protector 100 is shaped differently from in the earlier embodiments. This is to take account of the point that it lies adjacent upper teeth and a lower gum. The plate is therefore not bilaterally symmetrical in this embodiment. It has an upper part that is larger than the lower part, as can be seen in FIG. 9. This allows soft tissue to be protected appropriately by the buccal plate 100 without edges of the plate 100 protruding too far upwardly or downwardly. As is the case with all embodiments, any edge that may come into contact with soft tissue is preferably smooth/rounded rather than sharp, so as to reduce the risk of soft tissue damage.

Example 4

Fourth Embodiment

Device where a Bite Block is to be Held Between an Upper Gum and Lower Teeth In this embodiment a patient is partially edentulous, having upper teeth missing in the vicinity where the bite block 104 is to be used but having lower teeth 111 present. This is therefore the opposite arrangement of that described in Example 3.

As can be seen from FIGS. 10 and 11, the bite block 104 of the device 4 is held in place between an upper gum 110 and lower teeth 111.

The lower teeth 111 contact ridges 108 of a bite block 104 at the lower bite surface 103. The upper gum 110 fits into a recessed channel that forms the upper bite surface 102.

(Other alternatives are possible. The upper bite surface 102 does not have to be part of a channel that receives the gum, but may be a generally smooth surface/may be in the form of cushioning and/or may be in the form of deformable material upon which the gum can exert pressure. Indeed, many alternatives are possible, as long as the bite block can be held in place.)

The distance between the upper 102 and lower 103 bite surfaces can be set accordingly to achieve a desired spacing. Thus due account can be taken of the absence of teeth above the bite block 104.

It can be seen from FIG. 11 the cheek protector (buccal plate) 100 is shaped differently from in the embodiments of Examples 1 and 2. This is to take account of the point that it lies adjacent an upper gum 110 and lower teeth 111.

The buccal plate 100 is not symmetrical from top to bottom in this embodiment. It has a lower part that is larger than the upper part, as can again be seen in FIG. 11. This allows soft tissue to be protected appropriately by the buccal plate 104, without edges of the plate protruding too far upwardly or downwardly.

As is the case with all embodiments, any edge that may come into contact with soft tissue is preferably smooth/rounded rather than sharp, so as to reduce the risk of soft tissue damage.

The invention claimed is:

1. A device for removing material from the oral cavity of a patient during a procedure while propping the patient's jaws open in a manner that facilitates said procedure, the device being suitable for use at the left side and at the right side of the oral cavity so that it is not necessary to provide different left and right versions of the device, the device comprising:
   a) an inner surface having a bite block shaped to be held between an upper jaw and a lower jaw of the patient at one side of the oral activity in a manner that provides a dental practitioner with access to teeth and/or gums at the opposite side of the oral cavity;
   b) an oral evacuation tube, through which material passes when it is sucked out of the oral cavity, the oral evacuation tube being sufficiently elongate so that a part of said tube can be located outside of the oral cavity to allow said tube to be operably connected to a suction device when the bite block is in use; and
   c) an outside surface comprising a cheek protector having a convex shape to protect an inner cheek area at the same side of the oral cavity as the bite block, said outside surface and said inner surface facing away from each other and away from a longitudinal axis of the oral evacuation tube;
      wherein the bite block, the oral evacuation tube and the cheek protector are integral, non-releasable parts of the device and wherein, when the bite block is in use, the only extra-oral part of the device is an extra-oral part of the oral evacuation tube;
      said bite block comprising upper contacting surfaces for contacting the upper jaw and lower contacting surfaces for contacting the lower jaw, the upper contacting surfaces and the lower contacting surfaces facing opposite from each other and extending away from each other and away from said longitudinal axis of the oral evacuation tube;
   outermost surfaces of said cheek protector located orthogonally further from said longitudinal axis of the oral evacuation tube than outermost surfaces of said upper contacting surfaces and said lower contacting surfaces are located orthogonally relative to the longitudinal axis of the oral evacuation tube; and
   a bore passing through the bite block and the oral evacuation tube to allow said material to pass therethrough during removal, and the bite block having an aperture at a distal end opposite to the oral evacuation tube, said aperture connected to said bore to allow the material to pass through the aperture and into the bore when the suction is applied via the suction device.

2. A device according to claim 1, wherein said aperture is located between said upper contacting surfaces and said lower contacting surfaces.

3. A device according to claim 1 further comprising a supplemental aperture through said inner surface in fluid communication with said bore to allow a regulation of a suction applied through the aperture.

4. A device according to claim 3; wherein the supplemental aperture is smaller than the aperture in the bite block.

5. A device according to claim 4 wherein the supplemental aperture comprising a plurality of supplemental apertures in said inner surface.

6. A device according to claim 1, wherein a length of the bore is at least 4 cm.

7. A device according to claim 1, said upper contacting surfaces and said lower contacting surfaces converge towards the aperture of the bite block.

8. A device according to claim 1 wherein said upper contacting surfaces and said lower contacting surfaces consist of spaced ridges or steps.

9. A device according to claim 1; wherein the aperture extends from an end of the bite block along said inner surface between said upper contacting surfaces and said lower contacting surfaces, said aperture bounded by the bite block.

\* \* \* \* \*